United States Patent [19]  
Anderson

[11] 4,037,393  
[45] July 26, 1977

[54] HARVESTER ATTACHMENT  
[75] Inventor: Sidney Elmer Anderson, Geneseo, Ill.  
[73] Assignee: Deere & Company, Moline, Ill.  
[21] Appl. No.: 574,557  
[22] Filed: May 5, 1975  
[51] Int. Cl.² .......................................... A01D 45/02  
[52] U.S. Cl. ...................................................... 56/119  
[58] Field of Search ..................... 56/119, 2, 5, 14.2, 56/14.3, 14.5, DIG. 9

[56] References Cited  
U.S. PATENT DOCUMENTS

| 1,800,058 | 4/1931 | Dugger | 56/119 |
|---|---|---|---|
| 1,852,702 | 4/1952 | Coultas et al. | 56/119 |
| 2,349,905 | 5/1944 | Hyman | 56/119 |
| 2,751,744 | 6/1956 | Reade et al. | 56/119 |
| 2,862,345 | 12/1958 | Wigham | 56/119 |
| 3,271,940 | 9/1966 | Ashton et al. | 56/119 |
| 3,433,004 | 3/1969 | Blunk et al. | 56/119 |

Primary Examiner—Jay N. Eskovitz  
Assistant Examiner—James D. Hamilton

[57] ABSTRACT

A row crop harvester, such as a corn head, has a plurality of forwardly extending gathering members adapted to move between adjacent rows of row planted crops as the harvester advances, and each gathering member includes a hood-like downwardly and forwardly inclined shield structure having forwardly converging sides tapered to a forward gathering point. Removably mounted on top of the shield structure is a shield extension or ear saver that includes an upright inverted U-shaped support, the opposite ends of which are receivable in upright sockets on the opposite sides of the shield structure, a rear panel coplaner with the support and closing the interior thereof, the rear panel having a lower edge abutting the top of the shield structure, and a front panel that is generally semiconical in shape and extends forwardly and downwardly from the support, the apex of the front panel abutting the top of the shield structure. A quickly releasable latch is provided between the top of the shield structure and the front panel adjacent the apex, so that the shield extension can be quickly removed by releasing the latch and lifting the support and the front and rear panels attached thereto upwardly from the shield structure.

9 Claims, 4 Drawing Figures

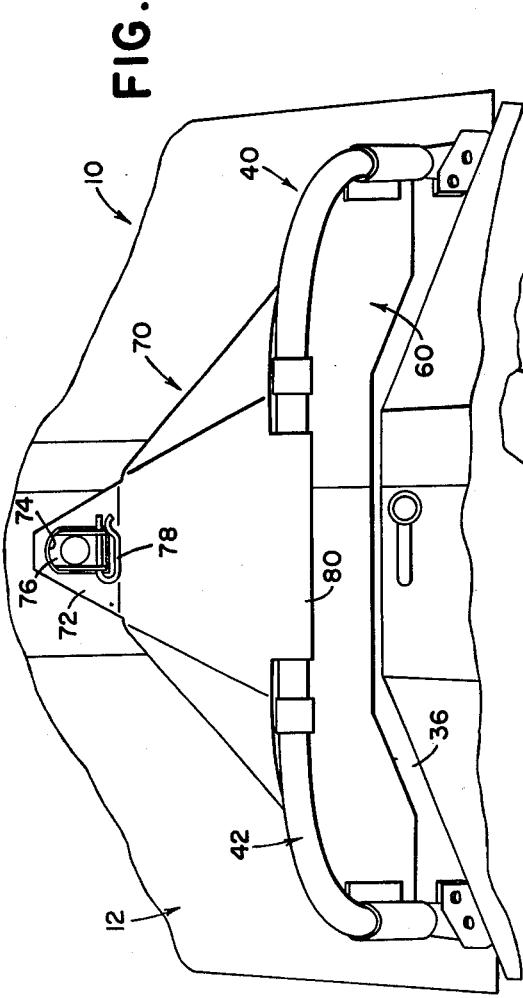
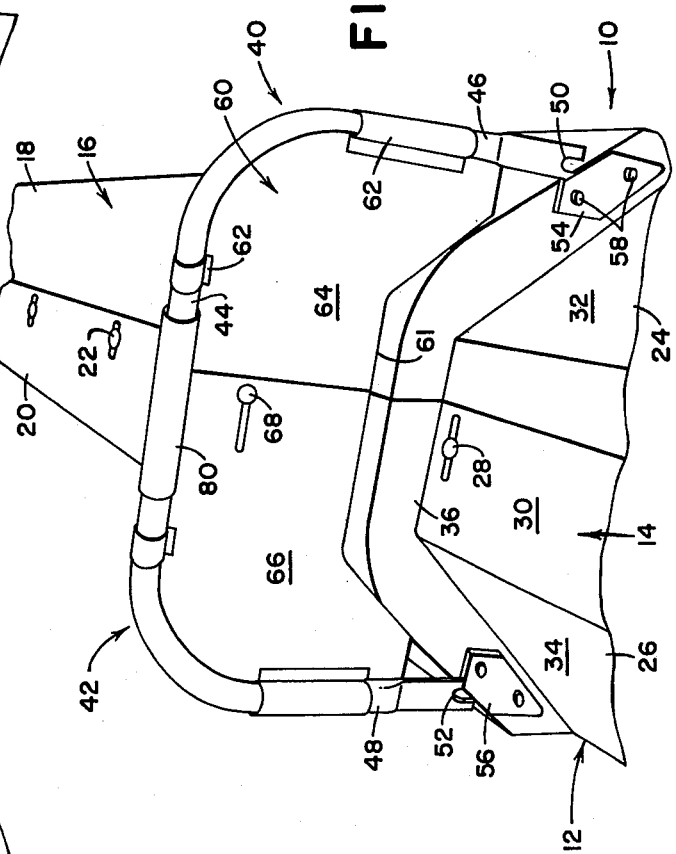
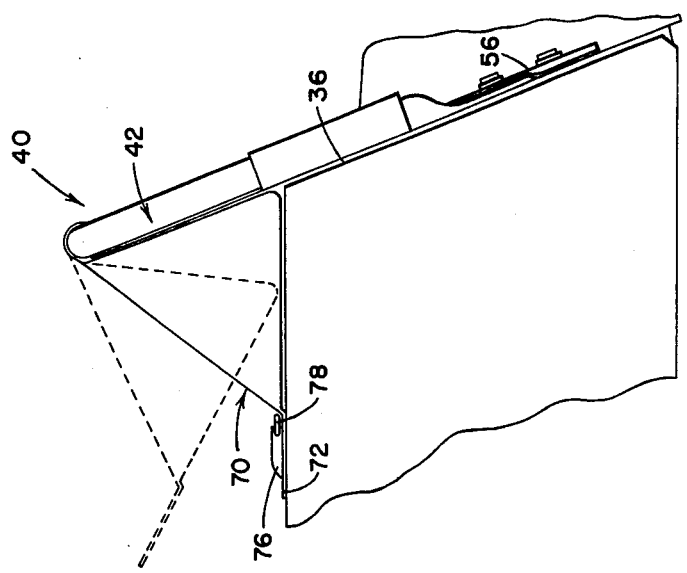
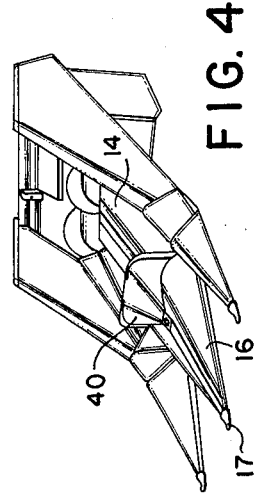

HARVESTER ATTACHMENT

BACKGROUND OF THE INVENTION

This invention relates to a row crop harvesting machine, such as is used for removing corn and the like from row planted stalks and more particularly to an improved attachment for such machine to prevent loss of crop material from the machine during the harvesting operation.

A row crop harvesting machine such as a corn head or a corn picker conventionally includes a plurality of laterally spaced forwardly extending gathering members that ride between the rows as the machine advances to direct the row planted crop material into fore and aft passages between the adjacent gathering members. The gathering members conventionally include hood-like shield structures that taper downwardly and forwardly to a forward gathering point that is normally positioned between the adjacent rows.

it is known to provide an upwardly extending shield extension or ear saver on top of the shield structure to catch any of the corn ears or the like that are dislodged from the stalk and fall on top of the shield structure, so that the crop material does not fall forwardly out of the machine, the shield extensions deflecting the crop laterally into one of the adjacent harvesting passageways where it is carried into the machine by the harvesting mechanism. While the shield extensions are desirable when the crop is standing upright, when the crop is down and tangled, the shield extensions can be a detriment, since the down and tangled stalks ride on top of the shield structure and are lifted thereby, and the upwardly extending shield extensions interfere with the rearward and upward movement of the stalks along the top of the shield stucture. While it has been possible to remove presently available shield extensions, the removal of currently available shield extensions has been a laborious and time-consuming job, and consequently, once the shield extensions are removed, in many cases they are never reinstalled, or at least they are not reinstalled as soon as it would be desirable, since the installation takes up valuable harvesting time.

SUMMARY OF THE INVENTION

According to the present invention, there is provided an improved shield extension or ear saver attachment for a gathering member on a row crop harvesting machine. More specifically, the improved shield extension is provided with means for quickly and easily removing or installing the shield extensions on the harvester.

An important feature in the invention resides in the fact that each shield extension can be removed by simply unlatching a single latch element and pulling the extension off the harvester. Another feature of the shield extension resides in its simple and rugged construction and in the specific configuration of the shield extension tht provides for efficient operation of the shield extension or ear saving attachment.

BRIEF DESCRIPTION OF THE DRAWINGS

FIG. 1 is a top plan view of a shield extension mounted on the top of a gathering member shield, only a central portion of which is shown.

FIG. 2 is a rear perspective view of the shield extension on the gathering member shield, a forward portion of the shield except for the front tip being shown and the shield extension being shown partially removed from the shield.

FIG. 3 is a side elevation view of the shield extension mounted on the shield structure, the alternate position of the front panel of the shield extension during removal of the extension being shown in dotted lines.

FIG. 4 is a persepctive view of a corn head having the improved shield extension, which is schematically shown.

DESCRIPTION OF THE PREFERRED EMBODIMENT

The invention is embodied in a corn head that is conventionally attached to self-propelled combine or to a harvesting machine such as shown in U.S. Pat. No. 3,646,732, also assigned to the assignee herein. As is well known, a corn head has a plurality of fore and aft passages formed between adjacent fore and aft extending gathering members, a portion of one of the center gathering members for such a corn head being shown in the drawings and indicated generally by the numeral 10. As is also well known, each passage receives the stalks of crops planted in one row as the machine advances, the corn head being provided with means for removing ears of corn from the stalks as the stalks move rearwardly along the passageway. The machine is also provided with means for moving the ears of corn rearwardly to the collecting mechanism after they are removed from their respective stalks. As is also well known, each gathering member conventionally includes a generally fore and aft downwardly and forwardly inclined and tapered shield structure or hood, indicated generally by the numeral 12, the shield structure tapering to a forward point that moves between the adjacent rows and acts to guide the crop material into the proper passage between the gathering member.

The shield structure 12 includes a generally inverted U-shaped rear portion 14 and a tapered forward portion or gathering point 16, which is generally in the shape of a half of a cone and includes a forward point or tip 17, only the rear portion of the gathering point 16 being shown in FIG. 2. The gathering point conventionally is swingable about a transervse pivot adjacent its lower rear edge so that it is free to follow the contour of the ground. The gathering point 16 is divided into right and left parts 18 and 20 respectively that are connected and overlap at a fore and aft seam, the amount of overlap being variable to provide an adjustment for different row spacings. The two parts of the gathering points are connected in the selected relative position by fasteners 22, which can be loosened to permit the adjustment of the overlap to vary the row spacings.

The rear portion 14 is inclined upwardly and rearwardly and like the gathering point is formed of right and left parts 24 and 26 that overlap along a fore and aft seam, the two parts also being releasably fastened together by fasteners 28 which permit adjustment of the amount of overlap to vary the width of the shield structure to a limited degree for adjustment to different row spacings. The rear portion 14 has a flat upwardly and rearwardly inclined top 30 and downwardly and outwardly inclined right and left sides 32 and 34, giving the rear portion an inverted U-shaped cross section. Shortly to the rear of the front end of the rear portion 14 is a rearwardly facing upright wall or step 36 that extends across the width of the shield structure, the step functioning to catch at least some of the loose ears lying on the rear portion and prevent their forward loss from the corn head.

A shield extension or ear saver attachment, indicated generally by the numeral 40 is removably mounted on the rear portion 14 and extends upwardly from the wall or step 36 to function as an extension of the step to further prevent the loss of loose ears from the front of the machine. The shield extension 40 includes an inverted U-shaped support 42 having a transverse bight portion 44 and depending right and left legs 46 and 48 respectively. The lower ends of the legs 46 and 48 are flattened and provided with downwardly open slots 50 and 52 and are insertable in right and left sockets 54 and 56, respectively mounted on the upright wall or step 36 adjacent the opposite sides of the shield structure. Each socket is formed by a bracket that is spaced from the step and connected thereto by a pair of bolts 58, the U-shaped slot at the bottom of the leg receiving the lower bolt when the support is mounted in the two sockets. As is apparent, the support can be removed from the sockets 54 and 56 by simply lifting the support upwardly.

The shield extension 40 includes a rear panel 60 that spans the height and width of the support 42 and has a lower edge 61 that conforms to the configuration of the shield structure immediately to the rear of the step, the front panel seating against the rear of the step when the shield extension is installed. The rear panel is connected to the support by a number of cylindrical mounting straps 62, and, like the shield structure, the panel is formed of right and left parts 64 and 66 that overlap and are connected by a fastener 68 that permits adjustment of the amount of overlap to vary the overall width of the panel. The horizontal bight portion of the support also telescopes to permit the adjustment in width.

The shield extension also includes a downwardly and forwardly inclined and tapered front panel 70 that is in the approximate shape of a half of a cone, with the rear portion of the front panel forming the base of the cone and seating aginst the rear panel or the support. The front panel 70 is downwardly open and tapers to a forward apex formed by a flattened tab 72, that seats against the top of the shield structure when the extension is installed. The tab 72 is provided with an aperture 74 that receives a projection 76, mounted on and extending upwardly from the top of the shield structure when the extension is installed, as shown in FIG. 1. A transversely extending latch pin 78 is insertable through the projection 76 above the tab, and when the latch pin is installed, as shown in FIG. 1, it prevents the upward movement of the front panel away from the top of the shield structure. The front panel is provided with a horizontal cylindrical strap or band 80 along its upper rear edge, the strap 80 permitting the front panel to be swung about the horizontal portion 44 of the support.

In operation, the shield extension is mounted on top of the shield structure by simply inserting the lower ends of the support legs into the respective sockets 54 and 56 and swinging the front panel downwardly so that the projection 76 extends through the opening 74, following which the latch pin 78 can be inserted to lock the extension in place. Removal of the extension is accomplished by simply moving the latch pin 78 and swinging the front panel 70 upwardly so that it clears the projection 76, as shown in dotted lines in FIG. 3, following which the support 42 is pulled from the respective sockets 54 and 56. As is apparent, the removal and the installation of the shield extensions can be easily and quickly accomplished, so that the operator can remove or install the extension according to the dictates of the crop conditions.

I claim:

1. In a multi-row crop harvester having at least one forwardly extending gathering member adapted to move between a pair of adjacent rows of row planted crops as the harvester advances and including a hood-like downwardly and forwardly inclidned shield structure on top of the gathering member with opposite forwardly converging sides, the combination therewith of an improved shield extension mounted on the shield structure and comprising: an inverted generally U-shaped support having opposite generally upright legs and a transversely extending bight portion; a pair of laterally spaced attachment means on the shield structure respectively adapted to removably mount the lower ends of the support legs on the shield structure; a front panel member mounted on and extending downwardly and forwardly from the support and having a lower edge adjacent the top of the shield structure forwardly of the support; and latch means operative between the top of the shield structure and a lower, forward portion of the front panel for releasably locking the pabel to the shield structure.

2. The invention defined in claim 1 wherein the front panel tapers downwardly and forwardly from the support toward an apex that abuts the top of the shield structure centrally thereof.

3. The invention defined in claim 2 wherein the latch means includes a projection extending upwardly, from the shield structure, an aperture in the front panel adjacent said apex and adapted to receive the projection when the shield extendion is installed on the shield structure, and a removable latch element removably mounted on the projection above said aperture, the latch element preventing the upward movement of the front panel away from said projection when the front panel aperture is positioned on the projection and the latch element is mounted on the projection.

4. The invention defined in claim 2 wherein the front panel is generally semi-conical, the base of the cone being connected to the support and the vertex of the cone forming the apex of the front panel.

5. The invention defined in claim 1 and including a generally upright rear panel mounted on the support in generally the same plane therewith and having a lower edge abutting the shield structure when the shield extension is mounted thereon.

6. The invention defined in claim 1 wherein each attachment means comprises an upright socket means adjacent one side of the shield structure and adapted to receive the lower end of one of the support legs to restrain fore and aft or lateral movement of the support leg while permitting free upward withdrawal of the support from the socket means.

7. The invention defined in claim 1 and including pivot means swingably mounting the front panel on the bright portion of the support for permitting swinging movement of the front panel on the support about a horizontal transverse pivot.

8. The invention defined in claim 7 and including a generally upright rear panel mounted on the support in generally the same plane therewith and having a lower edge abutting the top of the shield structure when the shield extension is mounted thereon.

9. In a multi-row crop harvester having at least one forwardly extending gathering member adapted to move between a pair of adjacent rows of row planted crops as the harvester advances and including a hood-like downwardly and forwardly inclined shield structure on top of the gathering member with opposite forwardly converging sides, the combination therewith of an improved shield extension mounted on the shield structure and comprising: a support including a pair of generally upright legs; a pair of upright socket means adjacent the opposite sides of the shield structure and adapted to receive the lower ends of the support legs to restrain fore and aft or lateral movement of the support legs while permitting free upward withdrawal of the support from the socket means; a front panel member mounted on and extending forwardly from the support, said front panel tapering downwardly and forwardly from the support toward an apex that abuts the top of a shield structure forwardly of the support and having a lower edge adjacent the top of the shield structure; a generally upright rear panel mounted on the support rearwardly of the front panel and having a lower edge abutting the top of the shield structure when the shield extension is mounted thereon; and latch means operative between the top of the shield structure and the front panel adjacent said apex for releasably locking the panel to the shield structure.

* * * * *

UNITED STATES PATENT OFFICE
CERTIFICATE OF CORRECTION

Patent No. 4,037,393                    Dated  26 July 1977

Inventor(s)  Sidney Elmer Anderson

It is certified that error appears in the above-identified patent and that said Letters Patent are hereby corrected as shown below:

Column 4, line 25, delete "pabel" and insert --panel--.

Signed and Sealed this

Eleventh Day of April 1978

[SEAL]

Attest:

RUTH C. MASON
Attesting Officer

LUTRELLE F. PARKER
Acting Commissioner of Patents and Trademarks